M. STENSLET.
GRAIN SHOCKER.
APPLICATION FILED MAY 19, 1910.
982,642.
Patented Jan. 24, 1911.
5 SHEETS—SHEET 1.
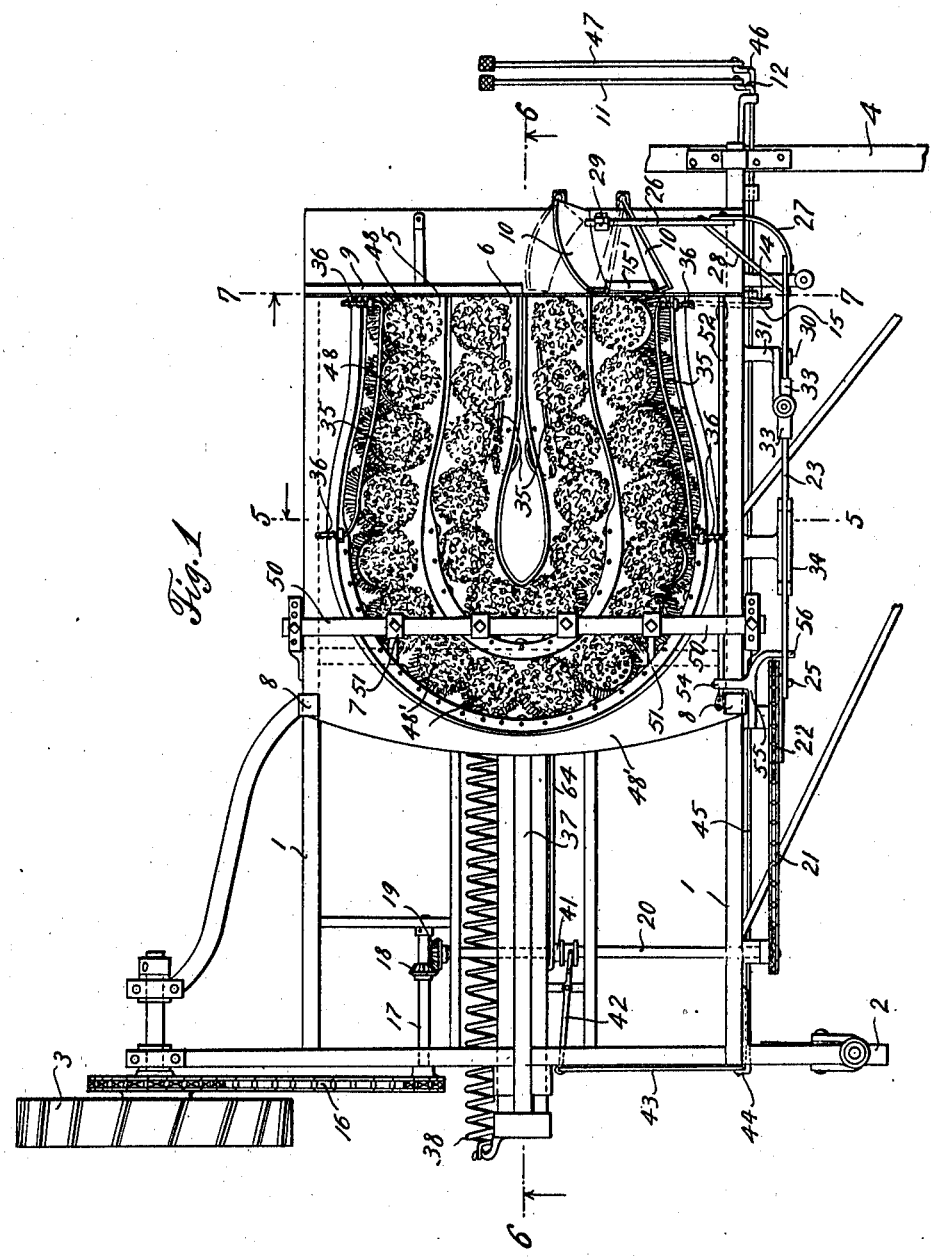

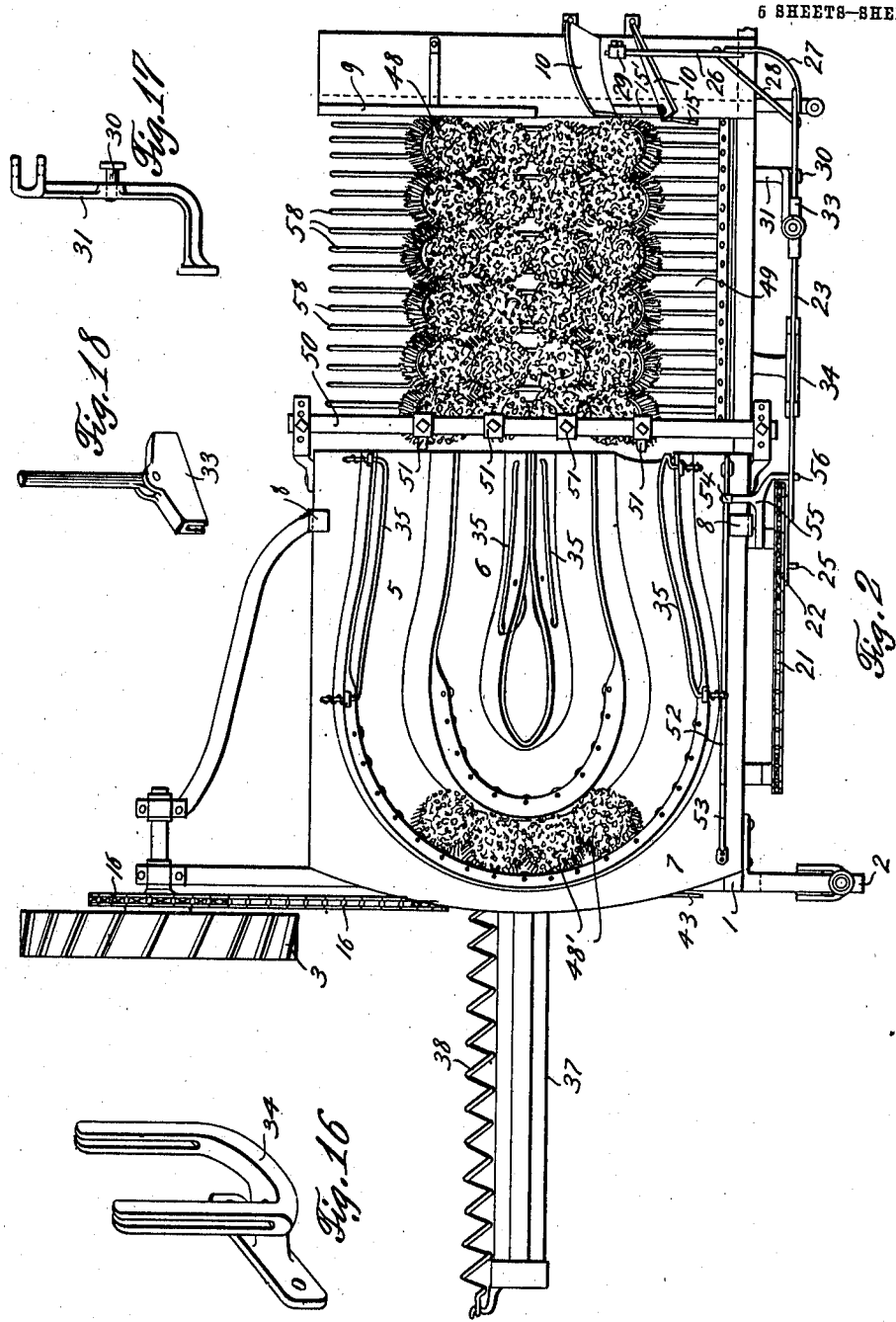

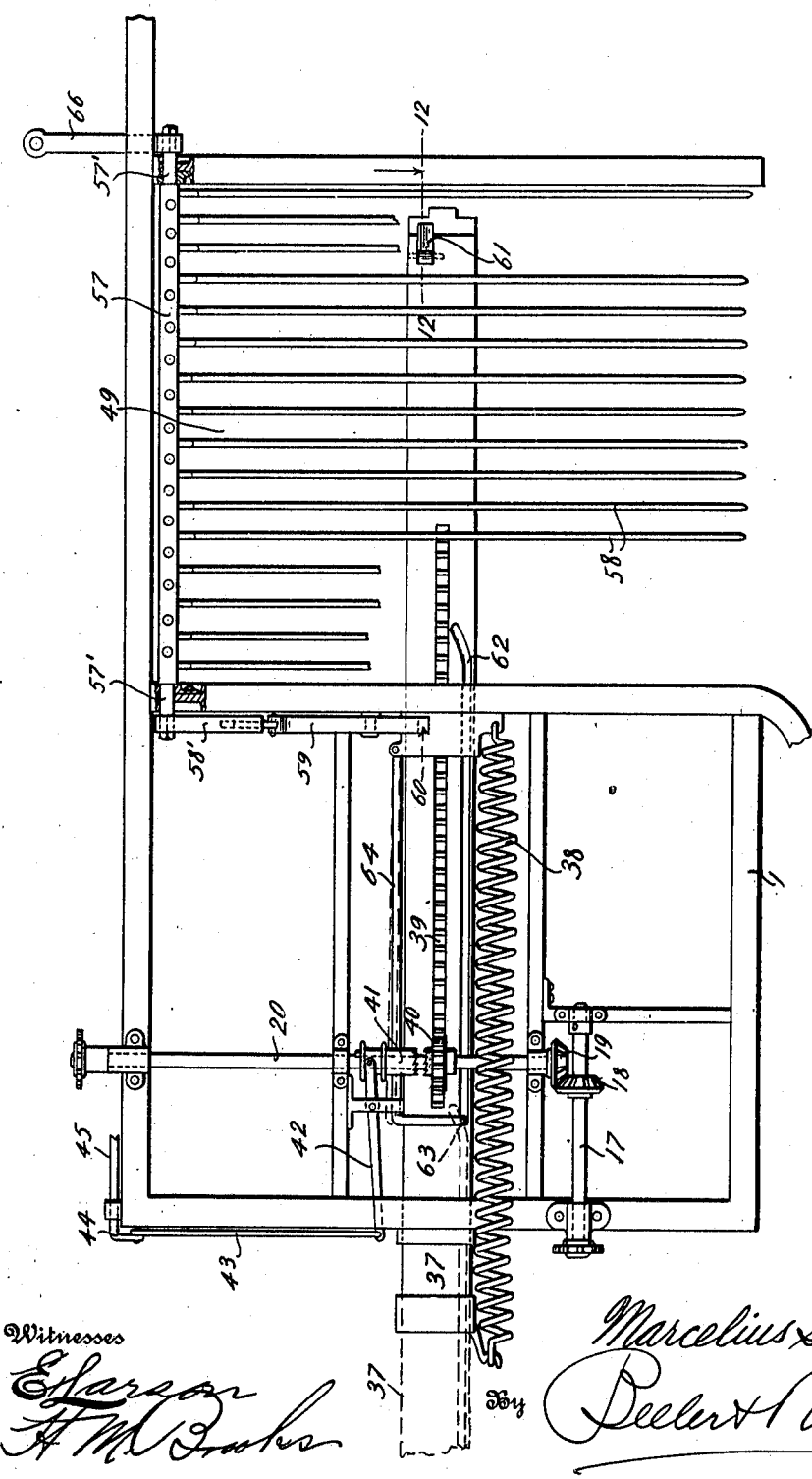

M. STENSLET.
GRAIN SHOCKER.
APPLICATION FILED MAY 19, 1910.
982,642.
Patented Jan. 24, 1911.
5 SHEETS—SHEET 4.
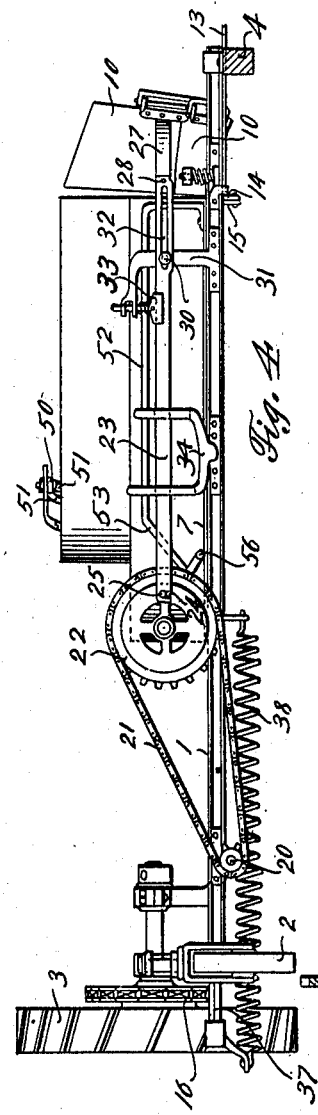
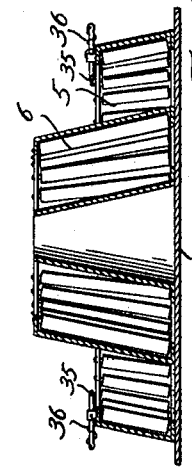
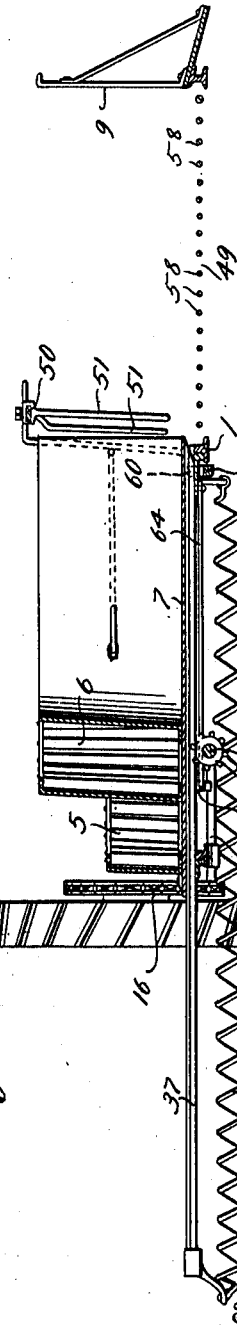
Witnesses
Inventor
Marcelius Stenslet
By
Attorneys M. STENSLET.
GRAIN SHOCKER.
APPLICATION FILED MAY 19, 1910.
982,642.
Patented Jan. 24, 1911.
5 SHEETS—SHEET 5.
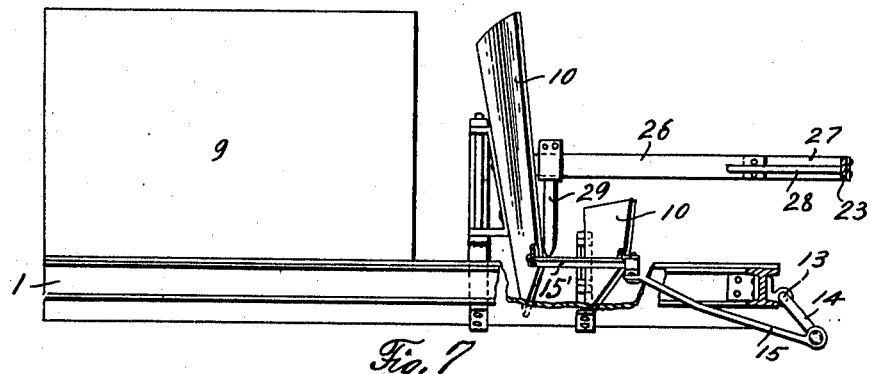
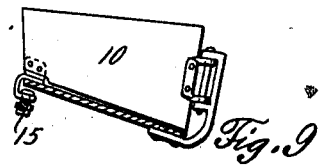
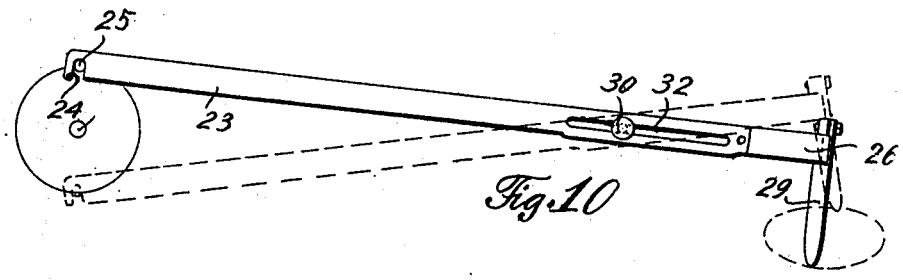
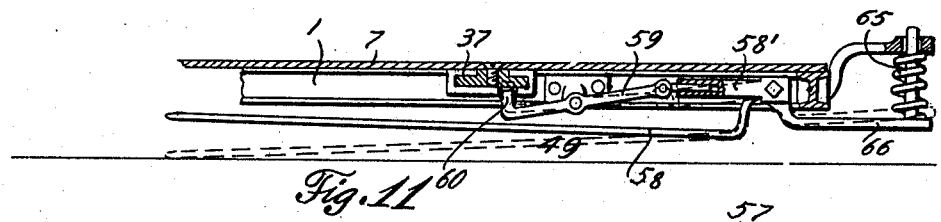
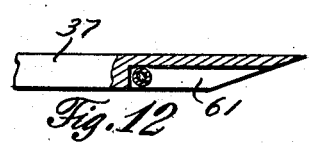
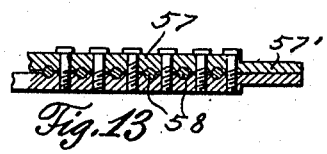
Witnesses
E. Larson
H. W. Brooks
Inventor
Marcelius Stenslet
By Peelert Pott
Attorneys

UNITED STATES PATENT OFFICE.

MARCELIUS STENSLET, OF COURTENAY, NORTH DAKOTA.

GRAIN-SHOCKER.

982,642. Specification of Letters Patent. Patented Jan. 24, 1911.

Application filed May 19, 1910. Serial No. 562,334.

*To all whom it may concern:*

Be it known that I, MARCELIUS STENSLET, a subject of the King of Norway, residing at Courtenay, in the county of Stutsman and State of North Dakota, have invented certain new and useful Improvements in Grain-Shockers, of which the following is a specification.

The object of this invention is to provide a machine for use in connection with harvesters for forming bundles of grain into a shock, and depositing the same upon the ground.

The machine comprising the invention is of that type adapted to be advanced with the harvester over a field, and an object of the invention is to provide certain novel shock forming mechanism for facilitating the operation of assembling the bundles to form the shock.

A further object of the invention is to devise special mechanism for feeding the bundles to the shock forming means, and to control the operation of certain mechanism of the machine in depositing the shock as the machine progresses over the field.

For a full understanding of the invention, reference is to be had to the following detail description and to the accompanying drawings, in which—

Figure 1 is a top plan view of a shock forming machine embodying the invention; Fig. 2 is a view similar to Fig. 1, the bottom of the shock former being shown in the position assumed thereby when depositing the shock upon the ground; Fig. 3 is a bottom plan view of the main portions of the machine; Fig. 4 is a front elevation; Fig. 5 is a section taken on the line 5—5 of Fig. 1; Fig. 6 is a transverse sectional view on the line 6—6 of Fig. 1; Fig. 7 is a section on the line 7—7 of Fig. 1; Fig. 8 is a detail view of the member connecting the two feeding wings; Fig. 9 is a detail sectional view showing the mounting of one of the wings; Fig. 10 is a detail view showing more clearly the movement of the pitman bar in being disengaged from the wheel; Fig. 11 is a fragmentary sectional view showing more clearly the means for locking the grain shocker in its inoperative position; Fig. 12 is a fragmentary sectional view on the line 12—12 of Fig. 3; Fig. 13 is a sectional view of the end bar carrying the depositing teeth; Fig. 14 is a section of the drive wheel and supporting bracket; Fig. 15 is a detail view of the disengaging bracket for the pitman bar; Fig. 16 is a detail perspective view of a guide bracket; Fig. 17 is an elevation of the bracket to which the pitman bar is pivoted; Fig. 18 is a detail perspective view of the shoe coacting with the pitman bar.

Throughout the following detail description and on the several figures of the drawings, similar parts are referred to by like reference characters.

Referring to the drawings, 1 designates the supporting frame of the machine which is mounted at its outer portion upon wheels 2 and 3, the latter having driving connection with certain parts of the operating means by which the shock is formed. The end of the frame 1 opposite the wheels 2 and 3 is adapted for connection by any suitable draft means with a beam 4 or other part of the harvester, the latter not being shown. Mounted on one end of the machine is the shock former which comprises a plurality of curved compartments 5 and 6, the same being shaped somewhat like a horseshoe in top plan view, and a bottom 7. The bottom 7 consists of a platform adapted to slide lengthwise of the frame 1 transverse to the forward movement of the machine, said platform being connected by suitable members 8 with the sides of the frame 1 so as to permit the sliding movement above referred to. The compartments 5 and 6 are closed at one end as shown at 9, and the opposite end of each compartment is open to receive the bundles of grain as the same are fed thereto from the harvester. A feeding device is provided for the compartments 5 and 6 and comprises spaced pivoted wings 10, the lower ends of which converge as they approach the bottom of the shock former. The bundles of grain drop between the pivoted wings 10 from the harvester, one at a time, and as each bundle is deposited in the feeding device, it is transferred therefrom to the receiving end of the shock forming compartment, adjacent to which said feeding device is arranged. The pivoted wings 10 of the feeding device are movable from a position in which they register with the walls of one of the compartments 5 and 6, to a position in which they register with the walls of the other compartment, and by this means, as soon as the inner compartment 6 is filled, the feeding wings are moved forwardly so that the bundles fed thereto will be transferred to the outer compartment 5 of the shock former. The movement of the wings 10 is controlled manually by means of a foot lever 11 connected with the arm 12 of the shaft 13, said shaft having an arm 14 attached to a bar 15, the latter in turn being connected with a plate 15' connected with the lower ends of the wings 10. Naturally when the foot lever 11 is depressed, the wings 10 will be moved from a position in which they feed to the compartment 6 into a position from which they will feed the bundles to the compartment 5, or vice versa. The walls of the compartment 6 are preferably higher than the outer wall of the compartment 5.

The ground wheel 3 is connected by a drive chain 16 with a short shaft 17 mounted in suitable bearings on the frame 1, and a bevel gear 18 on said shaft 17 meshes with a similar pinion 19 on the inner shaft 20. The shaft 20 is connected by a drive chain or belt 21 with the drive wheel 22 and the latter is constantly driven by the ground wheel 3 through said connections, and while the machine is in motion. A pitman bar 23 is formed at one end with a hook 24 adapted to engage over a wrist pin 25 on the wheel 22. To operatively connect said wheel with a shifting bar 26 arranged at a right angle to the pitman bar 23 and adjacent to the outer open end of the feeding member 10, the bar 26 is attached to the bar 23 by a heavy flat spring 27 and a brace 28, the spring 27 permitting slight yielding of the bar 26. The arm 29 depends from the rear end of the shifting bar 26, being adjustably secured to the latter, and said arm 29 is movable transverse to the forward movement of the machine in order to shift the bundle deposited between the wings 10 to the receiving end of the adjacent compartment 5 or 6, as the case may be.

In the operation of feeding the bundles of grain to the compartments 5 and 6, the pitman bar 23 is moved back and forth, and it also has a certain amount of up and down movement, being pivoted at 30 to the bracket 31 on the frame 1, the pivot pin 30 passing through a slot 32 in said bar which permits sliding as well as pivotal movement of the bar. The bracket 31 has mounted thereon a spring pressed shoe 33, the latter tending to hold the hook 24 of the bar 23 in engagement with the wrist pin 25 on the wheel 22. A suitable guide bracket 34 carried by the frame 1, assists in holding the bar 23 in proper position to be engaged and disengaged with respect to the operative connection with the wheel 22.

Carried by the upper portions of the several walls of the compartments 5 and 6 are yieldable bundle engaging devices 35, springs 36 attached to the end portions of said members permitting the yielding action above referred to.

The bodily movement of the shock former is effected by means of a beam 37 slidable in suitable bearings carried by the frame 1 intermediate the front and rear ends of said frame, said beam 37 being rigidly attached to the bottom 7 of the shock former, and thus adapted to carry the latter from one end of the frame 1 to the other. A spring 38 is connected with the outer end of the beam 37 and with a cross bar of the frame 1, said spring normally tending to hold the shock former in a position adjacent to the feeding device comprising the wings 10. In its under side the beam 37 has a rack 39 engaged by a toothed wheel 40, loosely supported on the shaft 20, and a clutch 41 is adapted to operatively connect the wheel 40 with the shaft 20 so as to rotate said wheel and cause outward movement of the beam 37 against the tension of the spring 38. The clutch 41 is controlled manually by means of a shifting lever 42 connected by a rod 43 with the arm 44 of the shaft 45 extending the entire length of the machine and having at its inner end another arm 46 connected with a foot lever 47.

It will be apparent that the bundles of grain after being fed into the compartment 6 by the shifting arm 29 may subsequently be fed into the compartment 5 by shifting the wings 10 on operation of the foot lever 11. When the second compartment 5 has been filled, the operator actuates the foot lever 47, shifting the clutch 41 to rotate the toothed wheel 40. The shock former including the platform 7 and the compartments in which the bundles are received will then be moved outwardly on the frame 1 and the bundles 48 will be swept from the compartments 5 and 6 onto a movable support 49 beneath the bottom of the shock former. Certain bundles 48' in the outer compartment 5 will remain therein during the movement of the shock former to the outer portion of the frame 1, it being impractical to sweep said bundles from the compartment 5 because of the shape of the latter.

Spanning the frame of the machine above the compartments 5 and 6 is a bundle retarder 50 consisting of a transverse bar and depending stop arms 51 extending into the compartments 5 and 6. The arms 51 prevent movement of certain bundles of grain in the compartments 5 and 6 when the shock former is shifted to the outer portion of the frame, and in this manner as the shock former moves away from the feeding device, the bundles will be deposited on the support 49.

It is not desired that the feeding mechanism shall be operated after the shock former has moved outwardly to permit the deposit of certain bundles on the support 49 and hence a disconnecting bar 52 is mounted on the bottom of the shock former, and is provided at one end with an inclined cam extension 53 adapted to engage a roller 54 on the arm of a pivoted bracket 55. The bracket 55 has an arm 56 extending beneath the pitman bar 23 and when the cam arm 53 raises the roller arm of the bracket 55, the hook 24 of the bar 23 is disengaged from the wrist pin 25 of the wheel 22. Said wheel continues to rotate but the shifting bar 26 has its motion stopped.

The support 49 comprises an end piece 57 pivoted on the frame 1 by trunnions 57', and a plurality of spaced teeth 58 projecting rearwardly from said end piece, and secured thereto, one trunnion of the end piece 57 having the arm 58' pivotally connected with a catch lever 59 pivoted to the frame and having a catch 60 adapted to engage in a recess 61 in the inner end of the beam 37. The purpose of the parts just described is to lock the beam 37 at the limit of its outward movement when the bundles are deposited on the support 49, and this is done by the weight of the bundles on the teeth 58 causing downward pivotal movement of the latter lowering the arm 58', and raising the catch 60 of the lever 59 so as to engage in the recess 61 of the beam 37. When all of the bundles for a shock have dropped on the support 49 the weight thereof is sufficient to depress the latter for the purpose above set forth and the grain passes between the teeth 58 to the ground. Immediately the bundles strike the ground their movement is retarded while the machine progresses forwardly with the harvester. The teeth 58 permit the bundles to slide off from the support 49 and as soon as the bundles are disengaged from the support, they rest entirely on the ground in the form of a shock as will be obvious.

The shock is deposited on the ground just as the beam 37 reaches the limit of its outward movement and a cam groove 62 in the bottom of the beam is engaged with a roller 63 on the bell crank shifting lever 64 attached to the frame, and said lever is then moved to disengage the clutch 41 from the wheel 40, discontinuing the outward movement of the beam. The beam is permitted to move to its normal position adjacent to the feeding device after the support 49 has passed from beneath the shocker because of the provision of a spring 65 engaging an arm 66 projecting forwardly from a trunnion 57' of the support 49, said spring normally tending to raise the teeth 58. Said teeth 58 are moved upwardly as soon as the shock is disengaged therefrom and the arm 58' is moved upwardly to disengage the catch 60 from the beam 37 whereupon the latter is brought back to its normal position by the spring 38.

It is contemplated that the peculiar pivotal and sliding movement of the pitman bar 23 shall give the depending arm 29 of the shifting bar 26 a sort of circular movement, whereby it transfers the bundles from the feeding device to the compartment of the shock former adjacent to both the walls of which the wings 10 are positioned.

It is of course contemplated that the several mechanisms hereinbefore described may be changed in so far as the specific construction illustrated is concerned and according to the broader spirit of the invention as prescribed by the claims hereto appended.

When the shocker is receiving bundles it is in its operative position for such purpose, but when it is moved away from the feeding mechanism it is inoperative so far as the reception of grain is concerned.

I claim:

1. In a grain shocking machine, the combination of a supporting frame, a grain shocker slidable thereon from a bundle receiving position to an inoperative position, said shocker comprising a bundle holding compartment, means for positively sliding the shocker into an inoperative position, feeding mechanism arranged to coact with the shocker to supply bundles of grain to its compartment when the latter is in a receiving position, a support adapted to receive the bundles of grain thereon when the shocker is moved to its inoperative position, and means operable by said support to lock the shocker in its inoperative position.

2. In a grain shocking machine, the combination of a supporting frame, a grain shocker slidably mounted thereon and comprising bundle receiving means, means for effecting sliding movement of said shocker comprising a beam connected therewith, an intermeshing rack and pinion device for actuating said beam, a spring for normally holding the shocker in a predetermined position, and means engageable by a delivered shock of grain for temporarily locking the beam and its actuated shocker in an inoperative position.

3. In a grain shocking machine, the combination of a supporting frame, a grain shocker slidably mounted thereon and comprising bundle receiving means, means for effecting sliding movement of said shocker comprising a beam connected therewith, an intermeshing rack and pinion device for actuating said beam, a spring for normally holding the shocker in a predetermined position, and mechanism for automatically releasing the shocker after its sliding movement to cause the spring aforesaid to return it to its normal position.

4. In a grain shocking machine, the combination of a supporting frame, a grain shocker mounted for sliding movement to operative and inoperative positions thereon, and comprising a compartment to hold bundles of grain, mechanism for feeding the bundles of grain to said compartment, means for moving the shocker to its inoperative position, means for delivering the bundles of grain from the compartment of the shocker as the latter is moved to its inoperative position, and means operable by the bundles of grain as they are delivered from the shocker to lock the latter in its inoperative position.

5. In a grain shocking machine, the combination of a supporting frame, a grain shocker mounted for sliding movement thereon, and comprising a compartment to hold bundles of grain, mechanism for feeding the bundles of grain to said compartment, means for moving the shocker to an inoperative position, means for delivering the bundles of grain from the compartment of the shocker as the latter is moved to its inoperative position, and means operable by the bundles of grain as they are delivered from the shocker to lock the latter in its inoperative position, and means coacting with the last mentioned means to release the shocker automatically after the supporting frame is advanced beyond the delivered bundles of grain.

6. In a grain shocking machine, the combination of a supporting frame, a grain shocker mounted for sliding movement thereon, and provided with an open end bundle receiving compartment, feeding mechanism associated with the shocker and comprising a feeding device adjacent the open end of the compartment, means for operating the feeding mechanism, means for moving the shocker away from the feeding device to an inoperative position, means for sweeping the bundles of grain from the open end of the compartment as the shocker is moved into its inoperative position, means for discontinuing the operation of the feeding mechanism on movement of the shocker to its inoperative position, and mechanism for restoring the shocker to its normal position.

7. In a grain shocking machine, the combination of a supporting frame, a grain shocker slidably mounted thereon, a feeding device associated with the shocker, driving mechanism for operating said feeding device including a pitman bar and driving wheel, means for moving the shocker to an inoperative position, and means for disconnecting the pitman bar from its driving wheel when the shocker is moved to its inoperative position.

In testimony whereof I affix my signature in presence of two witnesses.

MARCELIUS STENSLET.

Witnesses:
 H. S. STOANDNESS,
 HANS P. FERGLSTAD.